US008567573B2

(12) United States Patent
Hsieh

(10) Patent No.: US 8,567,573 B2
(45) Date of Patent: Oct. 29, 2013

(54) DOOR OPERATOR OF FIREPROOF DOOR

(76) Inventor: Chung Hsien Hsieh, Lin-Kou Hsiang (TW)

( * ) Notice: Subject to any disclaimer, the term of this patent is extended or adjusted under 35 U.S.C. 154(b) by 107 days.

(21) Appl. No.: 13/292,177

(22) Filed: Nov. 9, 2011

(65) Prior Publication Data

US 2013/0025804 A1 Jan. 31, 2013

(30) Foreign Application Priority Data

Jul. 27, 2011 (TW) ............................ 100126553 A

(51) Int. Cl.
*F16D 65/28* (2006.01)

(52) U.S. Cl.
USPC .............................................. 188/156; 160/9

(58) Field of Classification Search
USPC .................... 160/1, 7, 9, 188, 189, 310, 305; 188/156, 161, 166, 181 T; 49/139, 140, 49/197, 199, 322; 74/625
See application file for complete search history.

(56) References Cited

U.S. PATENT DOCUMENTS

| | | | | |
|---|---|---|---|---|
| 5,203,392 | A | 4/1993 | Shea | |
| 5,386,891 | A | 2/1995 | Shea | |
| 5,673,514 | A | 10/1997 | McKeon | |
| 5,893,234 | A | 4/1999 | McKeon | |
| 7,055,283 | B2 * | 6/2006 | Hsieh | 49/139 |
| 7,699,144 | B2 * | 4/2010 | Hsieh | 188/157 |
| 8,230,759 | B2 * | 7/2012 | Hsieh | 74/625 |
| 8,299,734 | B2 * | 10/2012 | Mullet et al. | 318/255 |

* cited by examiner

*Primary Examiner* — Katherine Mitchell
*Assistant Examiner* — Johnnie A Shablack
(74) *Attorney, Agent, or Firm* — Bacon & Thomas, PLLC

(57) ABSTRACT

A door operator of a fireproof door comprises a force applying end through which a driving force is transmitted by an input shaft; an output end for sustaining the weight of the door curtain which is transmitted to a central shaft through an output shaft; a clutch mechanism connecting the central shaft to the input shaft; a brake mechanism including a torsion spring disposed on the input shaft which bears the loading force transferred through the central shaft to vary the inner diameter of the torsion spring so as to restrain the input shaft from rotating; when an external force is applied to the input end, the inner diameter of the torsion spring is extended so that the input shaft is rotatable.

10 Claims, 9 Drawing Sheets

DOOR OPERATOR OF FIREPROOF DOOR

BACKGROUND OF INVENTION

1. Field of the Invention

The present invention relates to a door operator of a rolling door, more particularly to a door operator of a fireproof door which can be shut by rolling-down of door curtain due to its own weight in the event of a fire accident.

2. Brief Description of the Prior Art

Generally, a door operator used in a fireproof rolling door comprises either a failsafe type or a non-failsafe type door operator according to the type of operation. In power interruption condition, the failsafe type door operator releases a brake so as to close the fireproof door at once regardless of the cause of power interruption. In other words, even in the case that the power is not interrupted in the event of a fire accident, the power source can be cut off to release the brake by a fire fighting control device such as a smoke detector, a temperature sensor or the other fire monitoring device so that the door curtain is rolled down due to its own weight to close the door. The main feature of this type lies in that the door can be immediately closed in an event of a fire incident so as to block the fire and the dense smoke from spreading if the power interruption is certainly caused by fire.

In contrast to the above, the non-failsafe type door operator in power interruption condition still keeps the brake in an activated state regardless of the cause of power interruption so that the fireproof door is not shut immediately. Only in the case that the fusible link is melted by a high temperature caused by a fire, the mechanical type brake is actuated mechanically so that the door curtains fall downward due to their own weight to close the door. The main feature of this type lies in that personnel entering/leaving through the fireproof door is not interrupted if the power interruption is caused by non-fire factors.

So far, several documents concerning the failsafe type door operator of fireproof door have been proposed, for example, in U.S. Pat. No. 5,673,514 and U.S. Pat. No. 5,893,234. Basically, two electromagnets are used to maintain a brake device in a braking state under power-on condition, or to release the brake so as to close the door at once in the power interruption state. The structure of this failsafe door operator of fireproof door is very complicated and has a huge volume. On the other hand, documents concerning the non-failsafe door operator of fireproof door such as U.S. Pat. No. 5,203,392 and U.S. Pat. No. 5,386,891 are known to the public, in which either the manual operation of the door operator should be done through mode-switching or a chain is pulled to move a chain disc and at the same time the brake should be released to rotate a rotary shaft. Hence, improvement to use and structure of the conventional art is expected.

SUMMARY OF THE INVENTION

The main object of the present invention is to provide a simplified door operator of a fireproof rolling door by which a reel of the rolling door can be released to close the door in the event of a fire accident. Hence, the disadvantages of complicated structure, huge volume and inconvenient operation occurred in prior art can be improved.

In order to achieve above objects, the door operator of fireproof door according to this invention comprises: a housing enclosing an accommodation space and having an output shaft pivotally disposed at a first set position of the housing, the output shaft having an output wheel fixed at the left end thereof for rotating a reel of door curtain; an input shaft pivotally disposed at a second set position of the housing and rotated by an external force; a central shaft pivotally disposed at a third set position of the housing, the left end of the central shaft being linked with the output shaft and the right end thereof being fixed with an end disc; a sliding sleeve which is loosely fitted on the central shaft between both ends of the central shaft and slidable between a first position and a second position on the central shaft, a rotatable first gear disc being fixed at the right end of the sliding sleeve and engaged with a second gear disc fixed on the input shaft; a clutch mechanism which is arranged around the outer periphery of the left end of the sliding sleeve and holds the sliding sleeve at the second position under control so that the end disc and the first gear disc are connected with each other; a brake mechanism having a first bushing loosely fitted on the left end of the input shaft and fixed on the housing; a torsion spring arranged to encircle the outer periphery of the first bushing, one end of the torsion spring normally bearing the weight of the door curtain so that its inner diameter is shrunk to be tightly constricted on the first bushing so as to brake the input shaft; a driving mechanism comprising an input wheel fixed at the left end of the input shaft for applying an external force on the other end of the torsion spring to resist against the weight of the door curtain so that the inner diameter of the torsion spring is enlarged and the input shaft is rotated.

In this manner, when no external force is applied on the driving mechanism, the weight of the door curtain is applied on the output wheel and simultaneously the input shaft tends to twist the torsion spring so as to keep a brake in braking state; and when a fire accident happens, the clutch mechanism return the sliding sleeve to the first position under control so that the end disc is disengaged from the first gear disc. Thus, the door curtains can fall down due to their own weight to shut the door so as to block fire or the dense smoke from spreading in the event of fire accident.

According to the present invention, both ends of the torsion spring are free ends and formed with protrusion loops respectively. Each protrusion loop has a twisted direction side and a de-twisted direction side. The driving force applied from the input end is applied indirectly on the de-twisted direction side of the torsion spring so that the inner diameter of the torsion spring can be enlarged to rotate the input shaft. Alternatively, the weight of the door curtains of the output end is applied indirectly on the twisted direction side of the torsion spring so that the inner diameter of the torsion spring is shrunk so as to brake the input shaft. Activation and deactivation of the brake device upon operation or non-operation of the door operator is automatically realized by the torsion spring without an additional switching element. Therefore, the operation is convenient and probability of false is reduced. This is another object of the present invention.

According to the present invention, the mechanisms for the structure of the door operator are modulized and are arranged one above another. Further, by using the clutch mechanism with an input shaft being fitted into an output shaft, the structure of the door operator can be simplified and made compact. This is a further object of the present invention.

According to the present invention, the door operator can be configured as a failsafe type door operator of fireproof door by introduction of an electromagnetic clutch or configured as a non-failsafe type door operator of fireproof door by introduction of a mechanical clutch. The door operators of the two types are nearly made of the same common parts. Not only development cost is low but also the number of parts is less. The production is simplified, parts in stock is reduced and assembly is easy. This is still another object of the present invention.

According to the present invention, an exciting circuit for clutch is used to maintain power for the electromagnetic clutch under normal power supply condition. This circuit includes a delay circuit formed by a plurality of capacitors which charged in the normal state. The electromagnetic clutch can be energized and temporarily excited by the capacitors immediately after the abnormal power interruption caused by the fire accident so that the timing for shutting the door can be delayed for personnel evacuation. This is yet another object of the present invention.

DETAILED DESCRIPTION OF PREFERRED EMBODIMENTS

The technical features of the present invention will become more apparent by the descriptions of the following embodiments in conjunction with accompanying drawings. However, it is noted that the embodiments are only preferred embodiments of the present invention, not intended to limit the scope of the present invention. Further, the direction, the terms "left" and "right" shown in the context is for the convenience of description but not for restrictive purpose.

Figure 1:
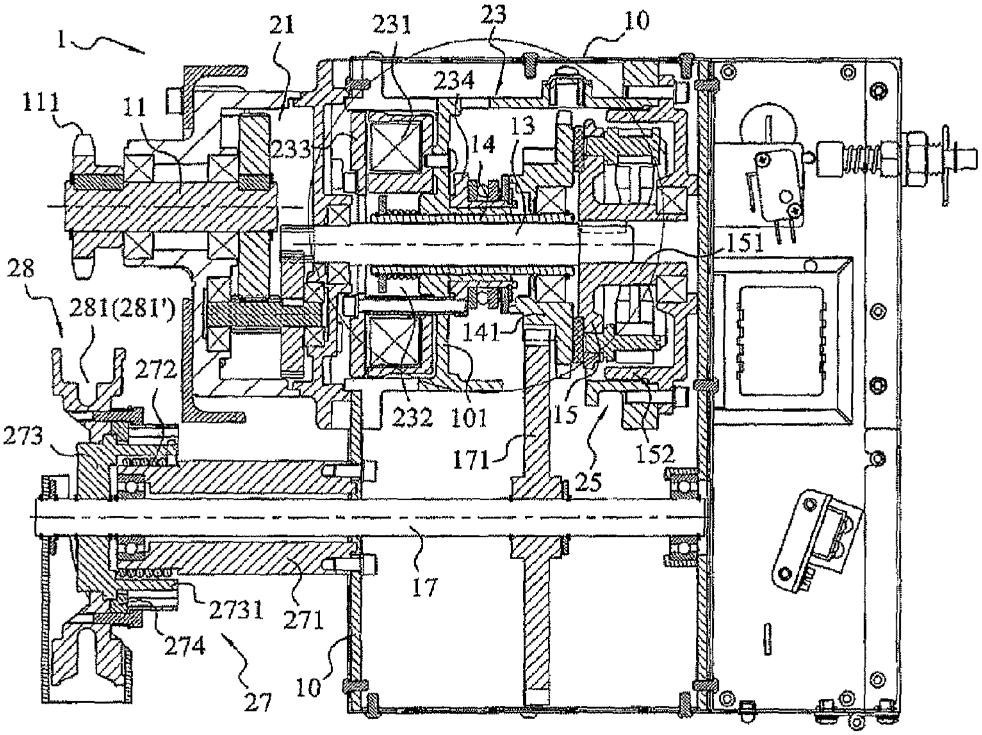
FIG. 1 is a schematic sectional view showing a first embodiment of the failsafe type door operator of fireproof door of the present invention.

Firstly, a first embodiment of the failsafe type door operator of fireproof door of the present invention is described by referring to FIG. 1 and FIGS. 1*a* to 1*h*. As shown in FIG. 1, the door operator 1 of the present invention comprises:

a housing 10 enclosing an accommodation space and having an output shaft 11 pivotally disposed at a first set position of the housing 10, the output shaft 11 having an output wheel 111 fixed at the left end thereof for rotating a reel (not shown) of the door curtains; an input shaft 17 pivotally disposed at a second set position of the housing 10, the input shaft 17 being rotated by applying an external force to an input wheel 281 fixed to the left end of the input shaft 17;

a central shaft 13 pivotally disposed at a third set position of the housing 10, the left end of the central shaft 13 having a conventional transmission means such as gears fixed to the left end of the central shaft 13 so as to be linked with the output shaft 11, and an end disc 15 fixed to the right end thereof, a brake lining 150 being provided on the left end face of the end disc 15;

a sliding sleeve 14 loosely which is fitted on the central shaft 13 between both ends of the central shaft 13 and slidable axially on the central shaft 13; wherein a first gear disc 141 is arranged at the right end of the sliding sleeve 14 in such a manner that the first gear disc 141 is rotatable with respect to the sliding sleeve 14 and is engaged with a second gear disc 171 fixed on the input shaft 17, so that the first gear disc 141 can slide axially together with the sliding sleeve 14 and be rotated with respect to the sliding sleeve 14;

an electromagnetic clutch mechanism 23 arranged to encircle the outer periphery of the sliding sleeve 14 at the left end and fixed on a partition plate 101 of the housing 10, the electromagnetic clutch mechanism 23 generating an electromagnetic force to move the sliding sleeve 14 to the right, so that the end disc 15 is kept connected with the first gear disc 141 through the brake lining 150;

a brake mechanism 27 having a first bushing 271 loosely fitted on the left end portion of the input shaft 17 and fixed to the housing 10; a torsion spring 272 arranged to encircle the outer periphery of the first bushing 271, one end of the torsion spring 272 normally bearing the weight of the door curtains so that its inner diameter tends to shrink so as to be constricted tightly on the first bushing 271 and to make the input shaft 17 unrotatable;

a driving mechanism 28, when an external force is applied through the input wheel 281 arranged at the left side, the left end of the torsion spring 272 being capable of resisting against the tendency of shrinking the inner diameter of the torsion spring 272 by the weight of the door curtains so that the inner diameter of the torsion spring 272 is enlarged and the external force can be acted to rotate the input shaft 17.

Figure 1A:
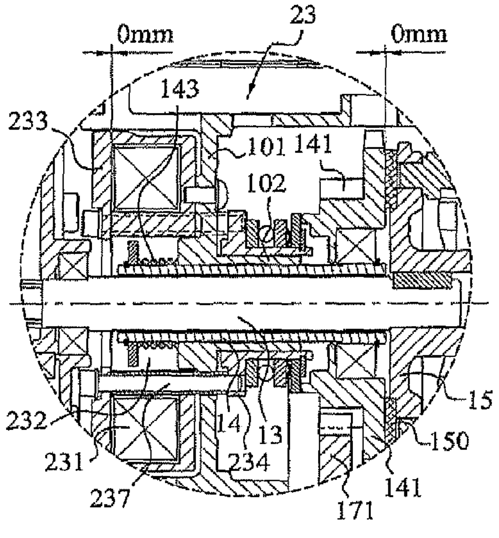
FIG. 1*a* is a partially enlarged view of the encircled portion of FIG. 1, showing that the clutch mechanism is in engaged state.
Figure 1B:
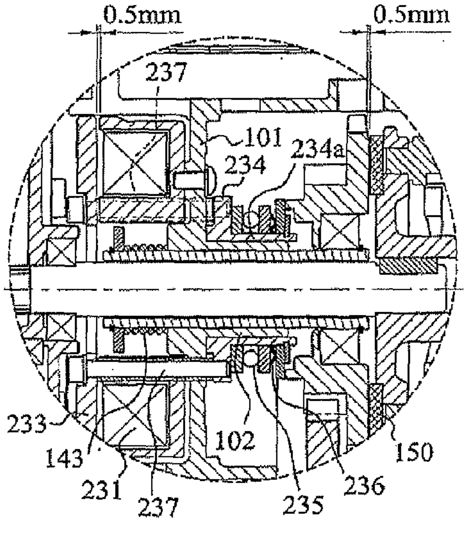
FIG. 1*b* is a partially enlarged view of the encircled portion of FIG. 1, showing that the clutch mechanism is in released state.
Figure 1C:
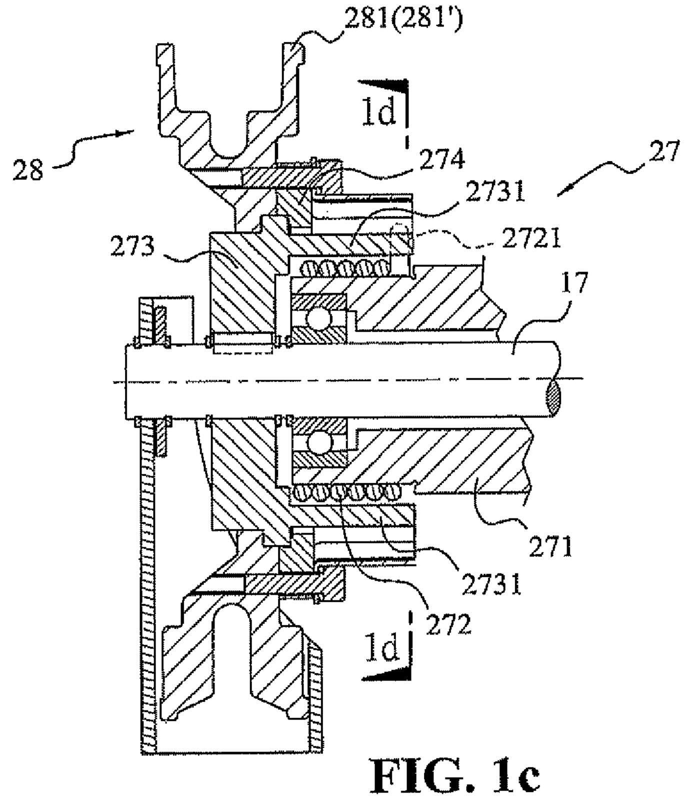
FIG. 1*c* is a partially enlarged view of the input end of the door operator shown in FIG. 1.

As will be described later, the brake mechanism 27 and the driving mechanism 28 can be integrated into a compact structure (as shown in FIG. 1*c*).

As shown in FIG. 1, the present invention further comprises a conventional reduction mechanism 21, formed by a plurality of gears, which is located between the central shaft 13 and the output shaft 11. The rotation speed of the central shaft 13 is reduced by the gears of the reduction mechanism 21 and transmitted to the output shaft 11; and a bushing 151 extending from the right end face of the end disc 15 coaxially with the central shaft 13; a conventional centrifugal type brake mechanism 25 arranged to encircle the outer periphery of the bushing 151 and fixed with the bushing 151 thereof. When the rotation speed of the central shaft 13 exceeds a predetermined value, a frictional force is generated on a brake drum 152, fixed on the housing 10, by centrifugal force produced by the centrifugal type brake mechanism 25 so as to retard the rotation speed of the central shaft 13.

Further referring to FIGS. 1*a* and 1*b*, the electromagnetic clutch mechanism 23 of the present invention comprises an electromagnet 231. A hollow accommodation portion 232 is enclosed with the interior of the electromagnet 231 and the left side end face of the partition plate 101. A second bushing 102 extending axially and encircling the sliding sleeve 14 is formed on the right side end face of the partition plate 101. The left end of the sliding sleeve 14 extends into the accommodation portion 232 through the partition plate 101. An active disc 233 is provided at the left side of the electromagnet 231, which has an end face facing the electromagnet 231. A passive disc 234 is loosely fitted on the second bushing 102. The left end face of the passive disc 234 is abutted against the right end face of the partition plate 101, and a bushing 234*a* extending coaxially with the second bushing 102 in the direction toward the first gear disc 141 is formed on the right end face of the passive disc 234. On the bushing 234*a*, a thrust bearing 235 and a reset spring 236 are provided in order between the passive disc 234 and the first gear disc 141. A plurality of screws 237 pass through the hollow accommodation portion 232 within the electromagnet 231 and the partition plate 101 from the active disc 233 and are connected integrally with the passive disc 234. An elastic element 143 is installed at the left end of the sliding sleeve 14, the elastic restoring force of the elastic element 143 urges the sliding sleeve 14 to slide to the left side. And in case of power failure, the first gear disc 141 connected with the sliding sleeve 14 slides to the left side together with the sliding sleeve 14 so as to be disengaged from the end disc 15, as shown in FIG. 1*b*. In normal power supply condition, an exciting circuit for clutch shown in FIG. 1*b* is used to maintain the electromagnet 231 in an excited state, and the active disc 233 is attracted by the electromagnet 231 and thus moved to the right. In this manner, the passive disc 234, which is fastened together with the active disc 233 by the screws 237, is abutted against the left end face of the first gear disc 141. At this moment, the sliding sleeve 14 arranged in such a manner that the sliding sleeve 14 is rotatable with respect to the first gear disc 14 resists against the elastic force of the elastic element 143 and thus is also moved to the right, so that the first gear disc 141 is abutted against the end disc 15 and is in frictional contact with the latter.

Figure 1D:
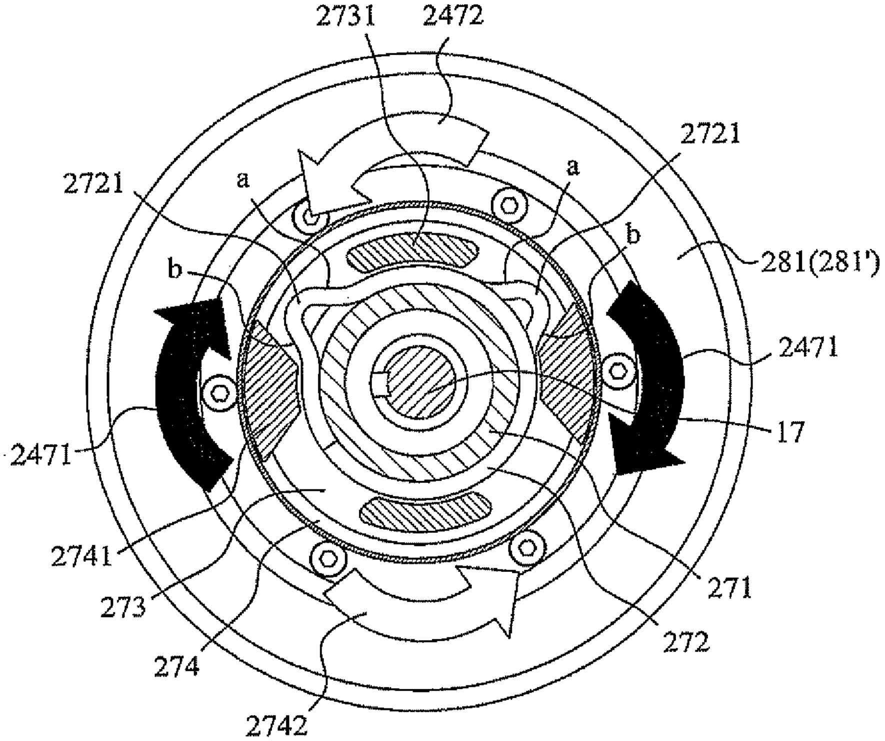
FIG. 1*d* is a schematic sectional view seen from the direction of line 1*d*-1*d* in FIG. 1*c*.
Figures 1E, 1F, 1G:
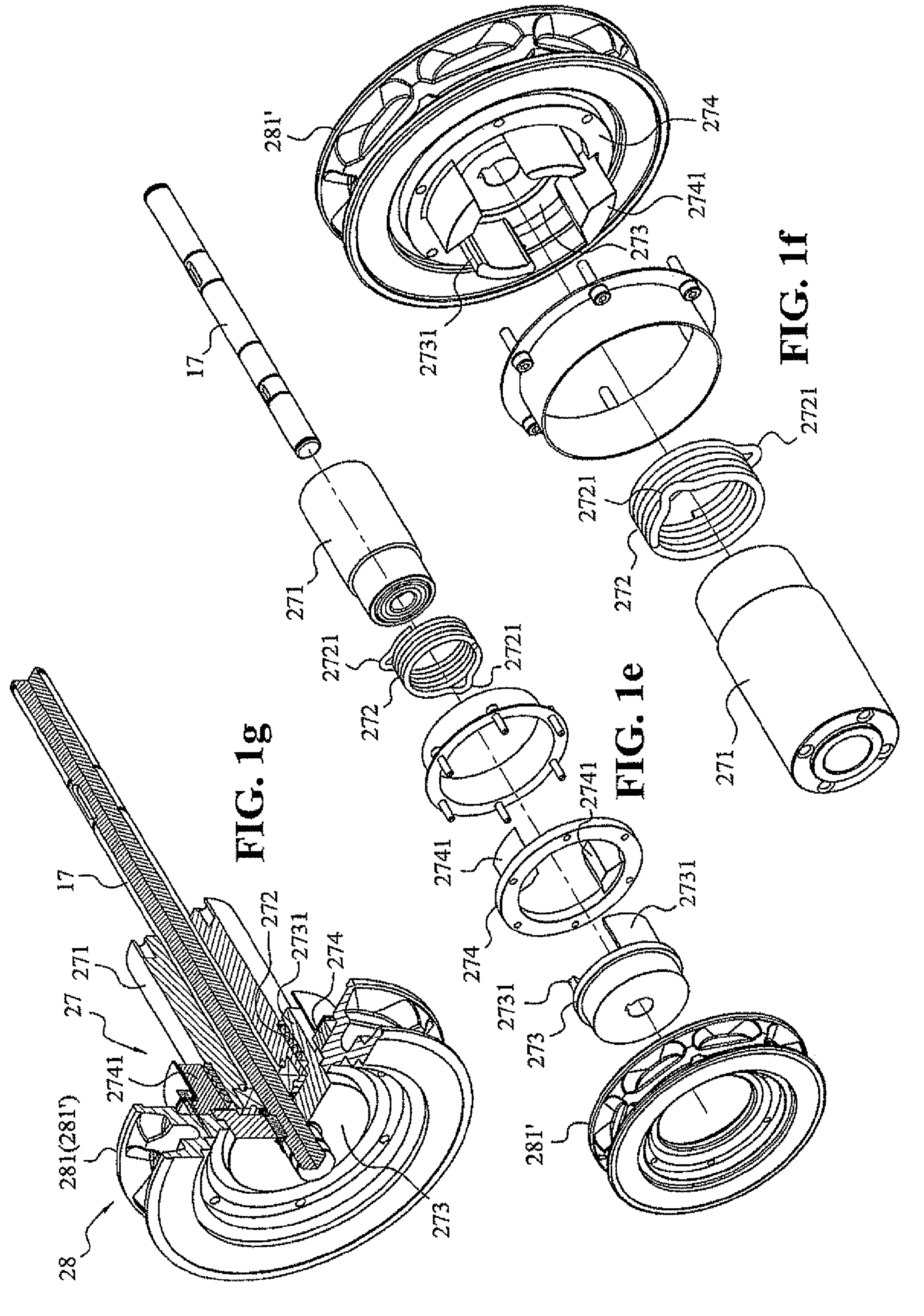
FIG. 1*e* is an exploded perspective view showing the brake mechanism and the driving mechanism of the present invention.
FIG. 1*f* is an enlarged exploded perspective view showing the brake mechanism and the driving mechanism in FIG. 1*e* of the present invention seen from another direction.
FIG. 1*g* is a perspective view showing the assembled state of the brake mechanism and the driving mechanism in FIG. 1*e*, in which it is sections in 90 degree.

Further referring to FIGS. 1*c* to 1*f*, the brake mechanism 27 and the drive mechanism 28 are integrated together by the torsion spring 272. The torsion spring 272 has an inner diameter which is tightly constricted on the left end portion of the first bushing 271. As shown in FIGS. 1*e* and 1*f*, both ends of the torsion spring 272 are free ends which have protrusion loops 2721 respectively projecting radially outward and staggering with each other by 90 degrees. As shown in FIG. 1*e*, an inner race portion 273 and an outer race portion 274 are fitted with each other and arranged at the left side of the second bushing 271. The outer race portion 274 is fixed on the input wheel 281 so that the inner race portion 273 and the outer race portion 274 can be rotated with respect to each other. On the right end face of the inner race portion 273, a pair of axial baffle plates 2731 arranged opposite to each other in radial direction are provided at places beyond the outer diameter of the torsion spring 272. Similarly, on the right end face of the outer race portion 274, a pair of axial pushing plates 2741 arranged opposite to each other in radial direction are provided at places on the same inner diameter as the baffle plate 2731. The pair of baffle plates 2731 and the pair of pushing plates 2741 encircle the periphery of the torsion spring 272, and gaps are formed respectively between the baffle plates 2731 and the pushing plate 2741 adjacent to each other for receiving respectively the two protrusion loops 2721 of the torsion spring 272. According to the present embodiment, the input wheel 281 is a chain disc 281' with a chain (not shown) wound on the periphery of the chain disc 281'.

Figure 1H:
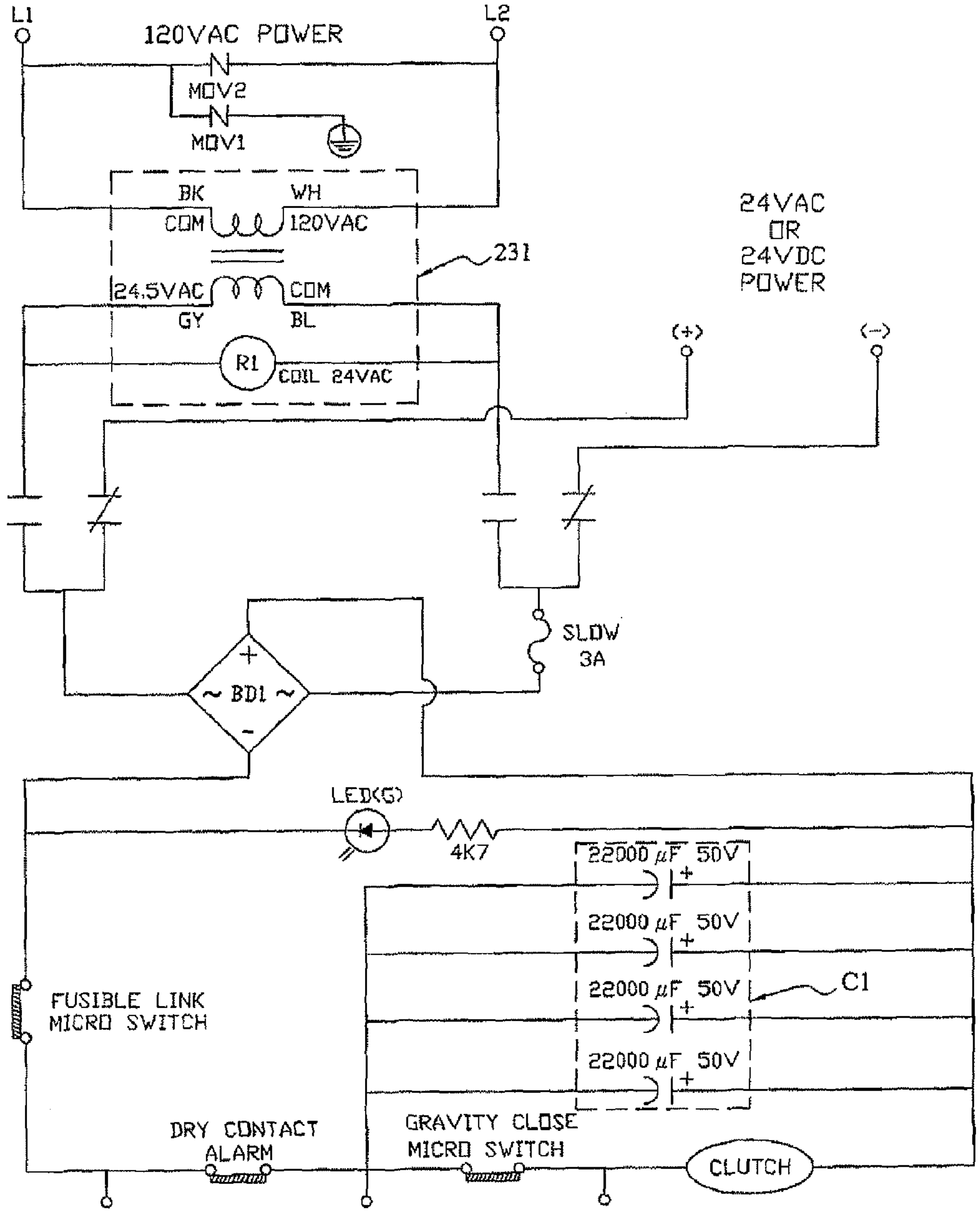
FIG. 1*h* is a schematic view showing the circuit utilized in the failsafe type door operator of fireproof door of the present invention.

Referring to FIG. 1*h*, FIGS. 1*a* and 1*b*, the operation of the door operator by using the torsion spring 272 of the door operator of the present invention will be described. In normal power supply condition, the exciting coil R1 reduces an electromagnetic force on the electromagnet 231 of the clutch mechanism 23 so as to attract and move the active disc 233 to the right side. Thus, the screws 237 fixed on the active disc 233 push and move the passive disc 234 together with the sliding sleeve 14 to the right side so that the first gear disc 141 is abutted against the end disc 15 and in a frictional contact with the latter. Therefore, the rotation of the input shaft 17 can be transferred to the central shaft 13 through the first gear disc 141 so as to maintain the linking up relation normally.

As shown in FIG. 1*d*, when the chain disc 281' of the driving mechanism 28 is pulled by a chain and thus rotated in the direction of black arrow 2471, the de-twisting side b of the protrusion loops 2721 of the torsion spring 272 is urged by the side edge of the pushing plate 2741 and the inner diameter of the torsion spring 272 is gradually enlarged so that the torsion spring 272, which is tightly fitted on the first bushing 271, is released. Thus, with the outside force applied continuously on the chain, the torsion spring 272 is forced and rotated along the outer periphery of the first bushing 271 so that the twisting side a of the torsion spring 272 will push and rotate the baffle plate 2731 on the other side of the protrusion loop 2721. Simultaneously, the input shaft 17 fixed together with the baffle plate 2731 is also rotated and the rotation is transferred through the second gear disc 171 fixed on the input shaft 17, the first gear disc 141 engaged with the second gear disc 171, the end disc 15 in frictional contact with the first gear disc 141 to the central shaft 13 fixed with the end disc 15, so that the central shaft 13 drives the door curtain through the output shaft 11 so as to open or shut the fireproof door. On the other hand, when no force is applied on the driving mechanism 28, the weight of the door curtains acts on the output wheel 111 and is transferred back through the output shaft 11 and the central shaft 13 to the input shaft 17. At this moment, as shown in FIG. 1*d*, the baffle plate 2731 on the inner race portion 273 fixed together with the input shaft 17 is urged and rotated and acts on the twisting side a of the protrusion loop 2721 of the torsion spring 272, when it is rotated in the direction of white arrows 2472. The more the door curtains are rolled out, the greater the torsion force on the twisting side a is. Therefore, the inner diameter of the torsion spring 272 becomes smaller and the force on the first bushing 271 becomes bigger so as to produce a braking state.

In an event of abnormal power interruption, the clutch mechanism 28 is demagnetized so that the central shaft 13 and the input shaft 17 are disconnected and the door curtains are smoothly rolled down to shut the door due to its own weight. Even if the power supply is not interrupted in the fire accident, the power supply can be cut off by a conventional sensor device such as a smoke detector, a temperature sensor or another fire detector device. According to the present invention, the circuit further comprises a delay circuit C1 formed by a plurality of capacitors which are charged in normal state. The exciting coil R1 of the electromagnet 231 can be energized and temporarily excited for, for example, 10 seconds by the capacitors immediately after the abnormal power interruption caused by the fire accident so that the timing for shutting the door can be delay for personnel evacuation.

Figure 2:
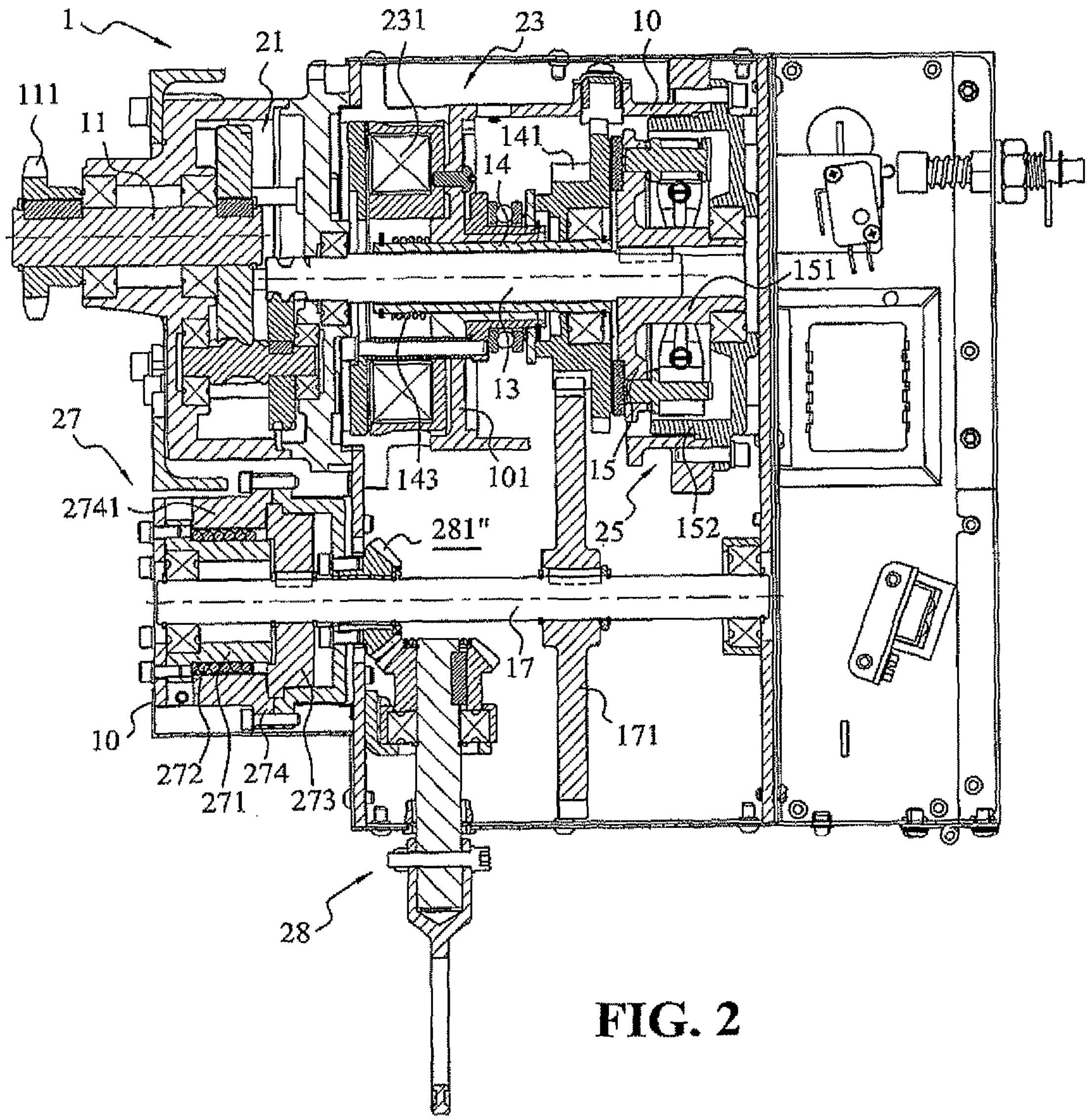
FIG. 2 is a schematic sectional view showing a second embodiment of the failsafe type door operator of fireproof door of the present invention.
Figure 2A:
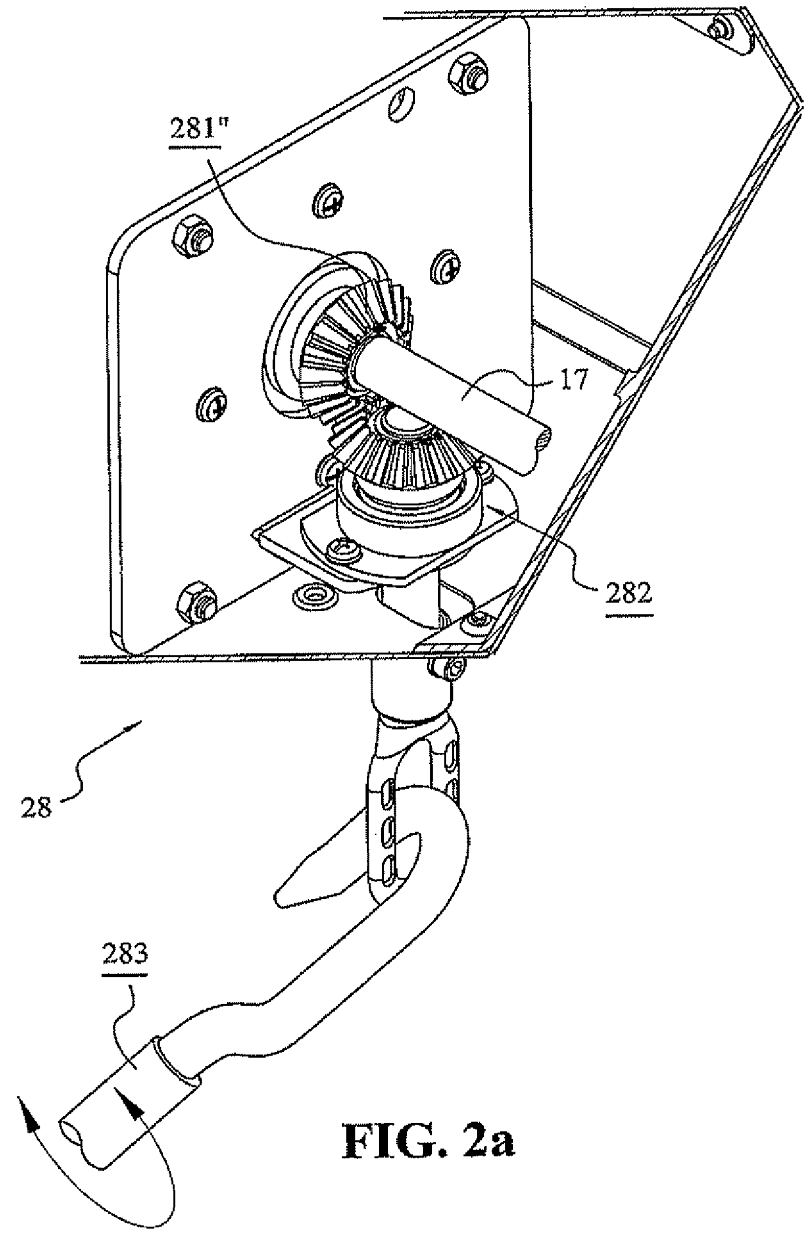
FIG. 2*a* is a partial perspective view showing the driving mechanism of FIG. 2.

FIGS. 2 and 2*a* show the second embodiment of the failsafe type door operator of fireproof door of the present invention. The basic configuration of this embodiment is similar to that of the above embodiment, so the description thereof is omitted. However, the reference numbers of elements different from that of the first embodiment are underlined. The difference of this embodiment with the first embodiment lies in that the arrange sequence of the brake mechanism 27 and the driving mechanism 28 integrated together in this embodiment is inverse to that of the first embodiment, and hence the brake mechanism 27 is arranged at the left end portion of the input shaft 17 from the driving mechanism 28. In the second embodiment, the input wheel 281 is a bevel gear 281" and a capstan device 282 is engaged with the bevel gear 281". The capstan device 282 is actuated by a handle 283 to apply a force to the torsion spring 272 so that the inner diameter of the torsion spring 272 is enlarged and the input shaft 17 is rotated.

Figure 3:
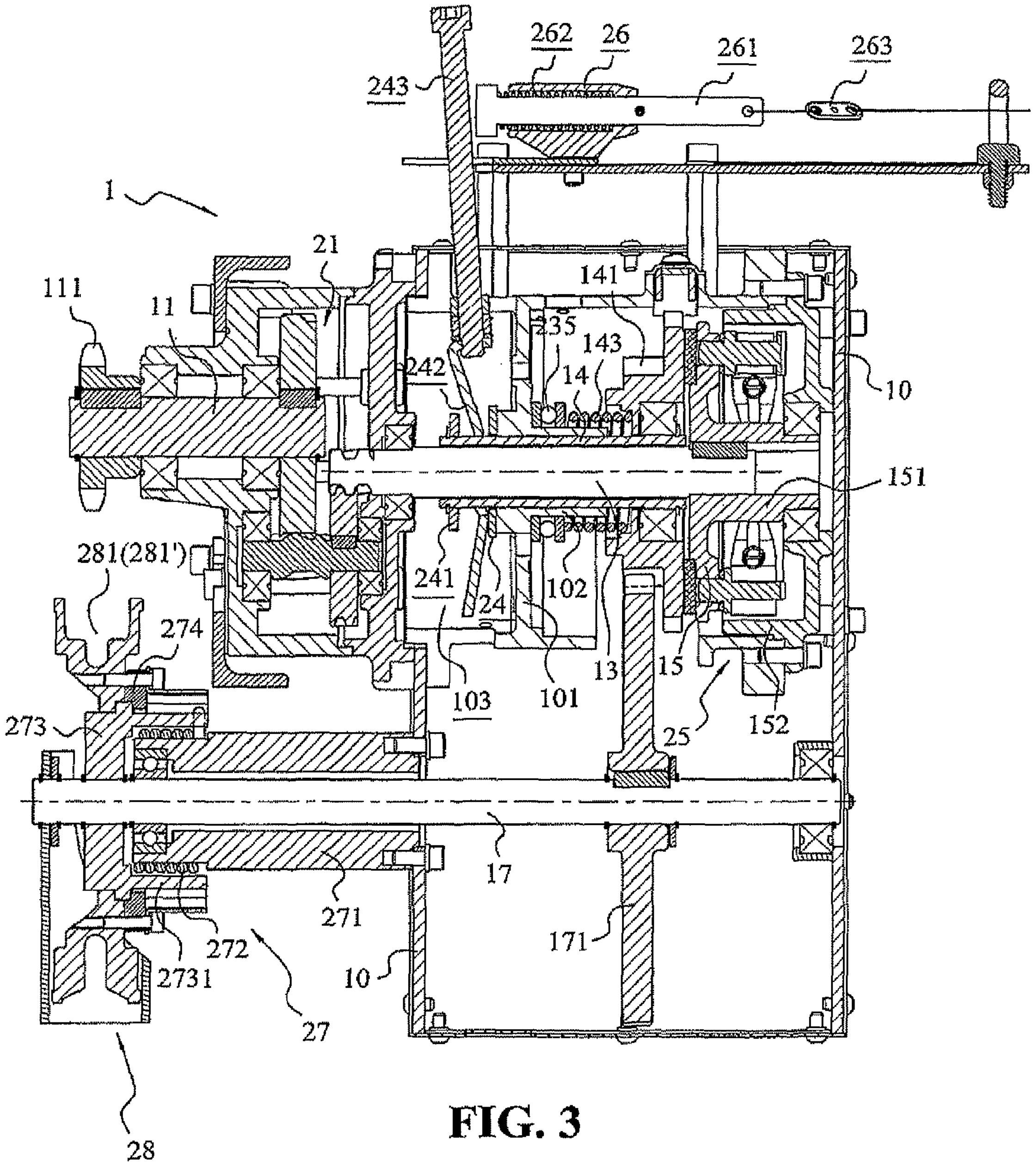
FIG. 3 is a schematic sectional view showing a third embodiment of the non-failsafe type door operator of fireproof door of the present invention.
Figure 3A:
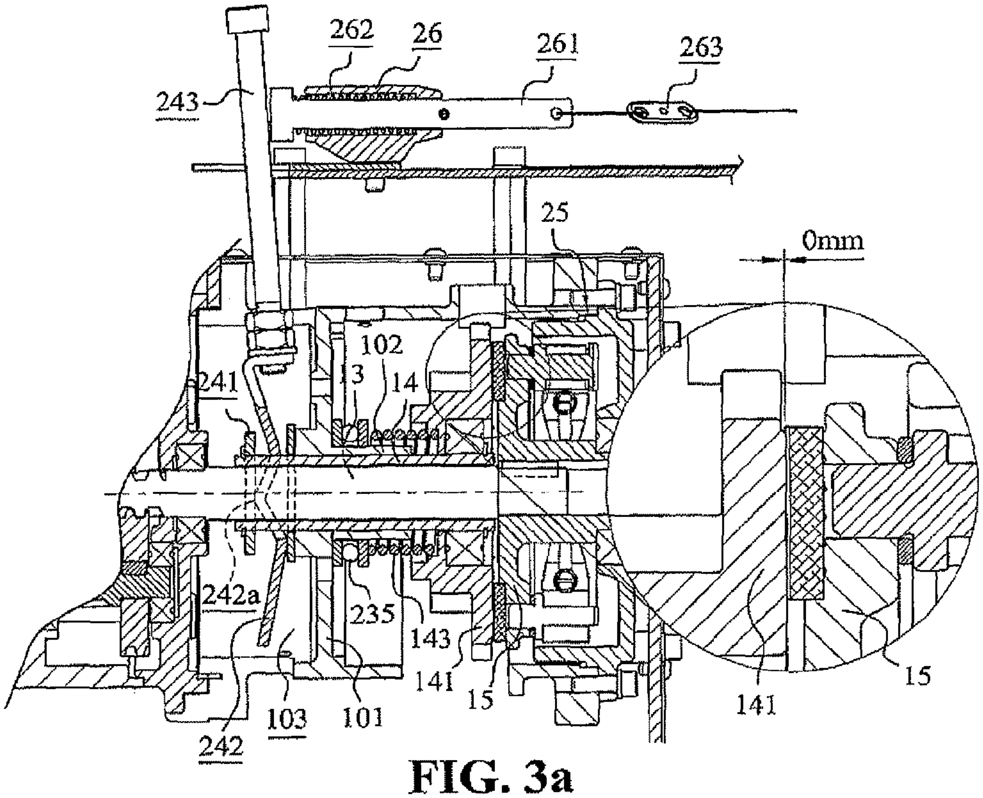
FIG. 3*a* is a partially enlarged view of the embodiment in FIG. 3, showing that the clutch mechanism is in engaged state.
Figure 3B:
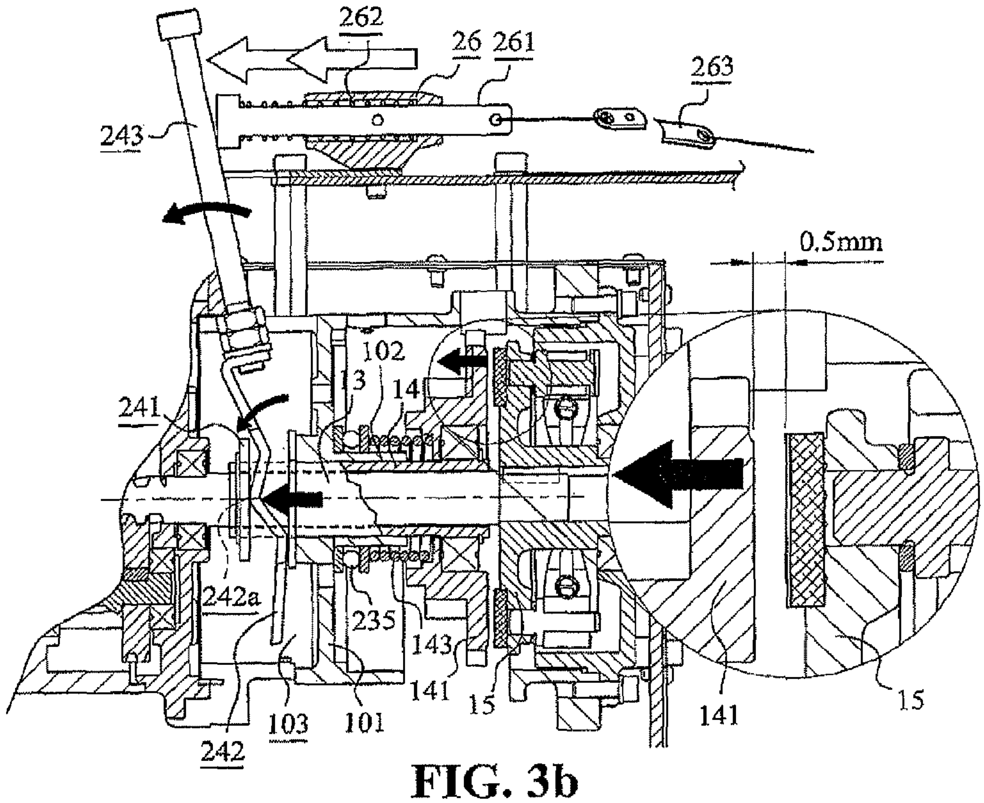
FIG. 3*b* is a partially enlarged view of the embodiment in FIG. 3, showing that the clutch mechanism is in released state.

Further, FIGS. 3, 3*a* and 3*b* show a non-failsafe type door operator of fireproof door of the third embodiment of the present invention. The basic structure of this embodiment is similar to that of the first embodiment of the failsafe type door operator of fireproof door. In this embodiment, the reference numbers of elements different from that of the first embodiment are underlined for distinction. In this embodiment, a mechanical type clutch substituted for the clutch mechanism 23 of the first embodiment comprises an accommodation portion 103 enclosed by the housing 10 and a partition plate 101, and the partition plate 101 is provided with second bushing 102 along the central shaft 13 in the direction opposite to the accommodation portion 103. The sliding sleeve 14 is interposed between the second bushing 102 and the central shaft 13, and the left end of the sliding sleeve 14 has a pair of limit rings 241 fitted thereon. The first gear disc 141 is rotatably fixed at the right end portion of the sliding sleeve 14 so as to slide together therewith. A thrust bearing 235 is installed in the second bushing 102, one end of the thrust bearing 235 is abutted against the end face of the partition plate 101, an elastic element 143 being provided between the other end of the thrust bearing 235 and the first gear disc 141 in such a manner that the sliding sleeve 14 tends to slide to right side so as to urge the end disc 15 and the first gear disc 141 to be in frictional contact with each other (as shown in FIG. 3*a*). An actuation plate 242 is fitted on the left end portion of the sliding sleeve 14. A hill shape convex face 242*a* projects from the end face of the actuation plate 242 and is positioned between the pair of the limit rings 241. A shift lever 243 has one end connected to a predetermined position of the actuation plate 242 and the other end extending out of the housing 10. A guiding element 26 is fixed on a frame outside the housing 10. A sliding element 261 is slidably provided within the guiding element 26, the left end of the sliding element 261 is biased toward the left side by a compressed elastic element 262, and the right end of the sliding element 261 is connected to a fusible link 263. As such, when ambient temperature exceeds the fusing point temperature of the fusible link 263 to cause melt-down of the fusible link 263, the elastic element 262 is released and urges the sliding element 261 to the left side and hit the shift lever 243 so that the sleeve 14 slides to the left side and the end disc 15 is disengaged from the first gear disc 141, as shown in FIG. 3*b*.

Figure 4:
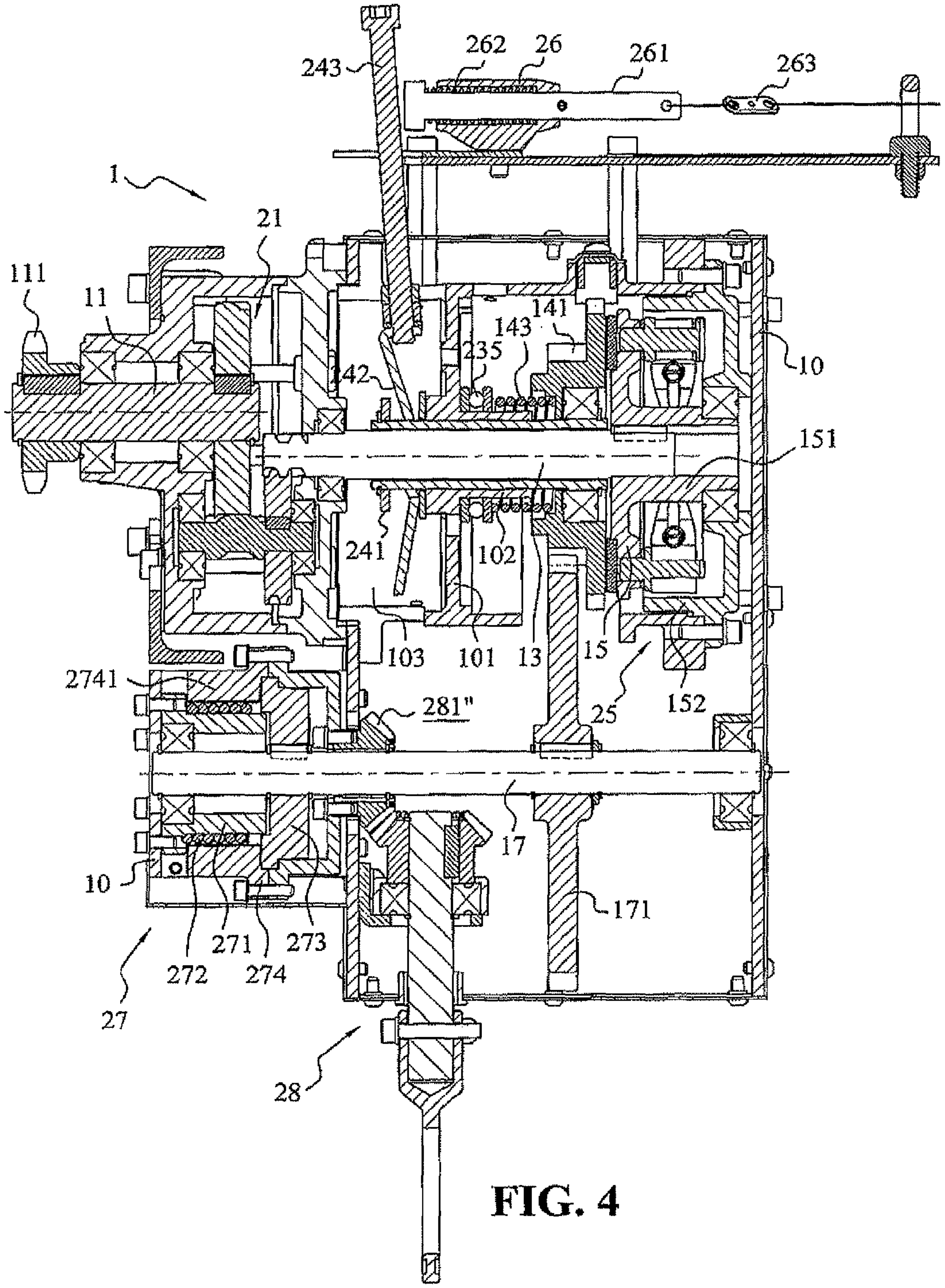
FIG. 4 is a schematic sectional view showing a fourth embodiment of the non-failsafe type door operator of fireproof door of the present invention.

FIG. 4 shows a non-failsafe type door operator of fireproof door of the fourth embodiment of the present invention. The basic structure of this embodiment is similar to that of the first embodiment of the non-failsafe type door operator of fireproof door. In this embodiment, the reference numbers of elements different from that of the first embodiment are underlined. A bevel gear 281" in this embodiment is substituted for the input wheel 281 of the first embodiment. The driving mechanism 28 further comprises a capstan device 282 linked with the bevel gear 281" (as shown in FIG. 2*a*), and the capstan device 282 is actuated by a handle 283 so as to apply a force in the de-twisting side of the torsion spring, so that the inner diameter of the torsion spring is enlarged and the input shaft is rotated.

Based on foregoing, the door operator of this invention can be configured as a non-failsafe type door operator of fireproof door by introduction of a mechanical type clutch. Since most of components of the non-failsafe type door operator can be used in the abovementioned failsafe type door operator of fireproof door. Not only development cost is low but also the number of parts is less. The production is simplified, parts in stock is reduced and assembly is easy. Moreover, as the shafts are arranged one above another and the inner shaft is fitted within an outer shaft, the structure of the door operator can be simplified and made compact. Further, activation and deactivation of the brake device upon operation or non-operation of the door operator is automatically realized by the torsion spring; hence the fireproof door can be shut in the event of fire so as to ensure the safety.

While the present invention has been described and illustrated by the above embodiments and the accompanying drawings, it is to be understood that the scope of this invention is not limited to these embodiments. Various variations and modifications can be made without departing from the spirit and the scope of this invention.

What is claimed is:

1. A door operator of a fireproof door for releasing a reel of a door curtain in an event of a fire accident, said door operator comprising:

a housing for supporting said door operator:

an input shaft pivoted in said housing, said input shaft having one end connected to a brake mechanism, and having one other end connected to a second gear disc;

a driving mechanism further comprising a driving force, said driving force actuating said brake mechanism to transfer the said driving force to said input shaft, wherein said driving force rotates said input shaft;

an output shaft pivoted in said housing, said output shaft having a first end connected to an output wheel for rolling up the door curtain to an open position, and a second end;

a central shaft pivoted in said housing, said central shaft having one end coupled to said second end of said output shaft, and having one other end connected to an end disc; and a clutch mechanism having a sliding sleeve disposed on said central shaft, said sliding sleeve being configured to move between a first position and a second position on said central shaft, one end of said sliding sleeve being provided with a first gear disc arranged to engage with said second gear disc;

wherein said brake mechanism comprises a first bushing fitted on said input shaft and fixed to said housing at one end portion thereof, and a torsion spring fitted on the other end portion of said first bushing;

whereby when said sliding sleeve of said clutch mechanism reaches the first position, said first gear disc attached to said sliding sleeve is moved to engage said end disc of said central shaft, said driving force actuates said brake mechanism to extend said torsion spring, said driving force transfers through said input shaft, central shaft, and output shaft to roll up the door curtain to said open position; when said driving force is not applied, the potential energy exists in the door curtain transfers through said output shaft, central shaft, and input shaft to contract said torsion spring to thereby locking said input shaft, and wherein when said sliding sleeve reaches the second position, the first gear disc disengages from said end disc, to thereby disconnecting said central shaft from said input shaft and releasing the reel such that the door curtain drops by gravity to close the fireproof door.

2. The door operator as claimed in claim 1, further comprising a reduction mechanism mounted between said second end of said output shaft and said central shaft.

3. The door operator as claimed in claim 2, further comprising a centrifugal brake mechanism disposed coaxially with said central shaft; said centrifugal brake mechanism is configured to brake said central shaft when the rotation speed of said central shaft reaches a predetermined value.

4. The door operator of a fireproof door as claimed in claim 1, wherein said clutch mechanism is a mechanical type clutch comprising a shift lever, a limit ring and an elastic element a partition plate being extended vertically in said housing and the other end of said sliding sleeve slidably penetrating through an end face of said partition plate; an actuation plate being assembled on one end of said shift lever said actuation plate having a zigzagging convex face projecting from one side thereof, said actuation plate being fitted on said other end of said sliding sleeve at said zigzagging convex face and placed between said limit ring and the end face of said partition plate; the other end of said shift lever being extended out of said housing; said elastic element being disposed and compressed between said first gear disc and said partition plate so that said sliding sleeve is normally located at said first position; when said shift lever is actuated, said convex face of said actuation plate is abutted against said limit ring so as to move said sliding sleeve to said second position.

5. The door operator as claimed in claim 4, wherein said clutch mechanism further comprises a guiding element, a sliding element, a compression spring and a fusible link, said guiding element being assembled on said housing, said sliding element penetrating through said guiding element and being slidable therein, said compression spring being disposed on said sliding element, said sliding element having one end arranged adjacent to said shift lever, and one other end connected to said fusible link, said fusible link melts and releases said sliding element when the ambient temperature exceeds the fusing point temperature of said fusible link, whereby said sliding element is capable of urging against said shift lever under the action of the elastic force of said compression spring, to thereby actuating said shift lever to move said sliding sleeve to said second position.

6. The door operator as claimed in claim 1, wherein said brake mechanism comprises an inner race portion and an outer race portion concentric and rotatable with respect to each other, said inner race portion being fixed on said input shaft and said outer race portions being fixed on said driving mechanism; said inner race portion includes a pair of baffle plates disposed on one top face of said inner race portion in a longitudinal direction and arranged opposite to each other in a radial direction, and said outer race portion includes a pair of pushing plates positions, disposed on one top face of said outer race portion at the same side with the baffle plates and arranged opposite to each other in the radial direction in such a manner that the baffle plates and the pushing plates are disposed alternately around said torsion spring; said torsion spring has two free ends, each free end is formed into a protrusion loop, both said baffle plates and said pushing plates are concentric and arranged at the same radius and each of said protrusion loops is received in a gap between one baffle plate and one pushing plate which are adjacent to each other, when said driving force actuates said brake mechanism at least one of said pushing plates urges against one of said protrusion loops adjacent thereto to extend said torsion spring, allowing said input shaft to rotate along with said torsion spring; when said driving force is not applied, the potential energy exists in the door curtain is transmitted to said input shaft, at least one of said baffle plates urges against one of said protrusions adjacent thereto, thereby contracting said torsion spring and locking said input shaft.

7. The door operator as claimed in claim 6, wherein said driving mechanism comprises an input wheel to which said outer race portion is fixed.

8. The door operator as claimed in claim 6, wherein said driving mechanism comprises a bevel gear, a capstan device and a handle, said bevel gear being fixed to said outer race portion said handle being engaged with said bevel gear and said handle being operatively connected to said capstan device; by actuating said capstan device with said handle, said bevel gear being driven and rotated by said capstan device.

9. The door operator as claimed in claim 6, wherein said clutch mechanism is an electromagnetic clutch comprising an electromagnet, an active disc and an elastic element, said electromagnet being assembled on said housing, said active disc being arranged adjacent to one side of said electromagnet, said elastic element being fitted on said sliding sleeve; one end of said elastic element being abutted against said sliding sleeve while the other end of said elastic element being abutted against said housing when said electromagnet is energized, said electromagnet attracts said active disc and moves said sliding sleeve to said first position so that said first gear disc is coupled with said end disc; when said electromagnet is de-energized, said elastic element bias said sliding sleeve to said second position so that said first gear disc is disengaged from said end disc.

10. The door operator as claimed in claim 9, wherein said clutch mechanism further comprises a delay circuit formed by a plurality of capacitors, said delay circuit energizing said electromagnet in an event of a power failure.

* * * * *